UNITED STATES PATENT OFFICE.

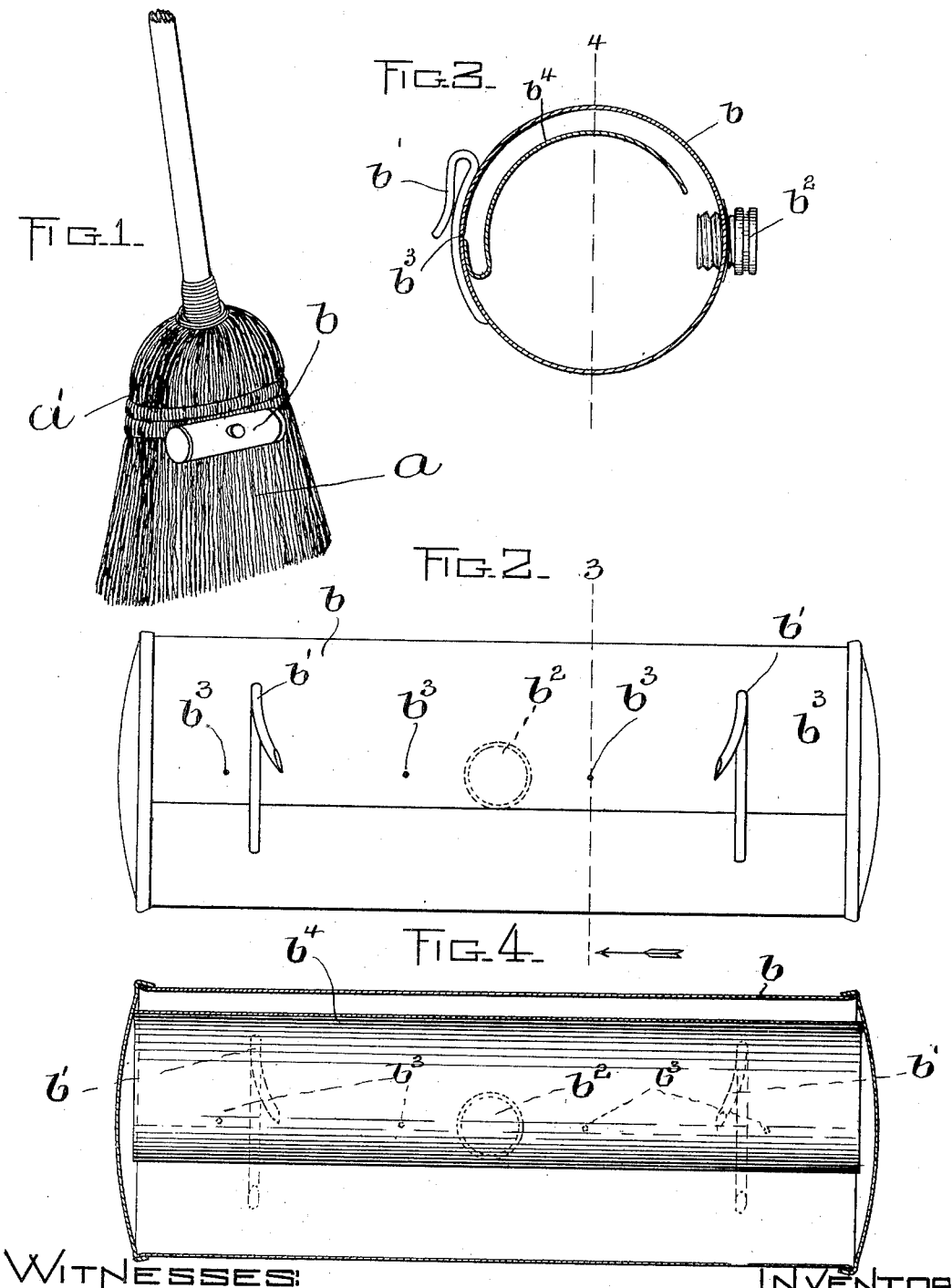

FRED B. MAYNARD, OF SOMERVILLE, MASSACHUSETTS.

BROOM-MOISTENER.

SPECIFICATION forming part of Letters Patent No. 630,086, dated August 1, 1899.

Application filed April 7, 1899. Serial No. 712,122. (No model.)

*To all whom it may concern:*

Be it known that I, FRED B. MAYNARD, of Somerville, in the county of Middlesex and State of Massachusetts, have invented certain new and useful Improvements in Broom-Moisteners, of which the following is a specification.

This invention has relation to broom-moisteners comprising a receptacle constructed to contain water or other suitable liquid and adapted to be attached to the broom, said receptacle having provisions for the escape of the water in small quantities onto the broom to moisten the wisps thereof and prevent the raising of dust when the broom is used.

The invention has for its object to prevent the direct access of the water contained in the receptacle to the place from which it escapes and to prevent its escape when the broom is in a prone position.

The invention consists in the improvements which I shall now proceed to describe and claim.

Of the accompanying drawings, Figure 1 represents a perspective view of a broom provided with a moistener such as that forming the subject of my invention. Fig. 2 represents a rear elevation, on an enlarged scale, showing a moistener. Fig. 3 represents a transverse sectional view of the moistener on the line 3 3 of Fig. 2, showing my improvement. Fig. 4 represents a longitudinal sectional view thereof on the line 4 4 of Fig. 3.

The same reference characters indicate the same parts in all the figures.

Referring to the drawings, $b$ designates an elongated cylindrical casing or receptacle adapted to contain water or other suitable moistening liquid and having hooks $b'$ $b'$, adapted to hook into the cording on the broom, whereby the receptacle is attached to the side of the broom. Water introduced into the interior of the casing $b$ through an aperture normally closed by a screw-stopper $b^2$ escapes onto the broom from the casing through a series of small apertures or pinholes $b^3$ $b^3$, extending along one side of the casing lengthwise thereof and below its top, preferably on or near the line of the hooks $b'$, said side being formed to bear against one side of the broom, so that the apertures will deliver liquid directly upon the surface wisps of the broom.

Inside the casing $b$ there is affixed a partition or baffle $b^4$, which extends for the length of the casing and is curved transversely to conform to the curvature of the wall of the casing. Said partition is attached at one edge to the wall of the casing just below the apertures $b^3$, and it preferably extends substantially half-way around the casing and terminates in a free edge just above the region of the stopper $b^2$. The attachment of the partition $b^4$ to the wall of the casing $b$ may be made by curving the said wall back on itself, as shown, the outer cylinder forming the casing being completed by a solder joint at the point where the partition is turned inwardly. A duct is thereby formed communicating at one end with the main space inclosed by the wall of the receptacle $b$ and at its other end with the apertures $b^3$. The partition $b^4$ being uppermost when the moistener is in use, it will be seen that the water contained in the receptacle $b$ has no direct outlet through the apertures $b^3$, but can reach said apertures only through the duct formed by the baffle $b^4$, the water being therefore forced to rise to the upper portion of the receptacle before reaching the outlet-apertures. The agitation, however, to which the moistener is subjected when the broom is in use causes the water contained in the receptacle to be sloshed or splashed up over the partition $b^4$ between the latter and the upper wall of the casing, and sufficient water leaks through the apertures $b^3$ to moisten the broom the desired amount. The water however, it will be seen, is only supplied to the apertures when the broom is agitated, as in sweeping. At other times it does not escape, and hence the casing can be filled nearly full without causing the escape of the water. If the broom is laid or accidentally knocked down, so as to lie in a prone position with the hooked side of the receptacle lowermost, the baffle $b^4$ effectually prevents the leakage of the water through the apertures $b^3$. If it lies prone in the other position with the stoppered side of the casing lowermost, the apertures $b^3$ will then be elevated and no water can escape through them.

It will be seen from the foregoing that I have provided a simple and efficient improvement in broom-moisteners, whereby their utility is considerably increased.

The specific construction herein described may be varied to some extent without departing from the spirit of my invention.

I claim—

1. A broom-moistener comprising an elongated liquid-receptacle having means for attachment to a broom, and presenting an elongated side formed to bear against one side of a broom, said elongated side having a series of apertures extending lengthwise of the receptacle and located below its top, and a baffle-plate or partition attached to the interior of the receptacle below said apertures and extending above the same, whereby the liquid in the receptacle is compelled to rise to the upper portion thereof before reaching said apertures.

2. A broom-moistener comprising a hollow receptacle constructed to contain a supply of liquid and having a series of apertures along one side for the escape of the liquid onto the broom, and a baffle or partition occupying the interior of the receptacle and attached at one edge to the wall thereof, near the said apertures, said partition following the wall of the receptacle past said apertures, part way around the receptacle, and terminating in a free edge, whereby there is formed along one side of the receptacle, between its wall and the said partition, a duct communicating at one end with the apertures and at the other end with the main space inclosed by the receptacle, the liquid being thereby caused to take an indirect path from said space to the apertures.

In testimony whereof I have affixed my signature in presence of two witnesses.

FRED B. MAYNARD.

Witnesses:
C. F. BROWN,
A. D. HARRISON.